United States Patent
Miyazaki

(10) Patent No.: US 9,793,526 B2
(45) Date of Patent: Oct. 17, 2017

(54) ELECTRIC STORAGE DEVICE AND ELECTRIC STORAGE APPARATUS

(71) Applicant: GS Yuasa International Ltd., Kyoto (JP)

(72) Inventor: Akihiko Miyazaki, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 0 days.

(21) Appl. No.: 14/227,416

(22) Filed: Mar. 27, 2014

(65) Prior Publication Data
US 2014/0295245 A1 Oct. 2, 2014

(30) Foreign Application Priority Data
Mar. 29, 2013 (JP) .................... 2013-075202

(51) Int. Cl.
*H01M 2/16* (2006.01)
*H01M 2/14* (2006.01)
(Continued)

(52) U.S. Cl.
CPC ......... *H01M 2/1673* (2013.01); *H01M 2/145* (2013.01); *H01M 2/166* (2013.01);
(Continued)

(58) Field of Classification Search
CPC .................................................. H01M 2/1673
See application file for complete search history.

(56) References Cited

U.S. PATENT DOCUMENTS 6,558,438 B1 * 5/2003 Satoh ............... H01M 10/0413
29/623.1
2002/0006548 A1 * 1/2002 Tsutsue et al. ............... 429/217
(Continued)

FOREIGN PATENT DOCUMENTS

EP 2169743 3/2010
EP 2713420 4/2014
(Continued)

OTHER PUBLICATIONS

Extended European Search Report dated Aug. 5, 2014 issued in the corresponding European patent application No. 14161906.4.

*Primary Examiner* — Sarah A Slifka
*Assistant Examiner* — Brian Ohara
(74) *Attorney, Agent, or Firm* — Rankin, Hill & Clark LLP

(57) ABSTRACT

An electric storage device includes: a container; an electrode assembly contained in the container, the electrode assembly including a positive electrode having a positive electrode substrate and a positive electrode active material layer that is formed on the positive electrode substrate and contains a positive electrode active material, a negative electrode having a negative electrode substrate and a negative electrode active material layer that is formed on the negative electrode substrate and contains a negative electrode active material, and a separator interposed between the positive and negative electrodes; and an electrolyte contained in the container, wherein the separator is configured such that a stress caused at a specific compressed depth in the separator, which corresponds to 5% of the thickness of the negative electrode active material layer, is 0.5 MPa or more and 14 MPa or less. An electric storage apparatus includes a plurality of electric storage devices described above.

15 Claims, 8 Drawing Sheets

(51) Int. Cl.
 *H01M 2/18* (2006.01)
 *H01M 10/0525* (2010.01)
 *H01M 10/0587* (2010.01)

(52) U.S. Cl.
 CPC ....... *H01M 2/1653* (2013.01); *H01M 2/1686* (2013.01); *H01M 2/18* (2013.01); *H01M 10/0525* (2013.01); *H01M 10/0587* (2013.01); *Y02E 60/122* (2013.01); *Y02T 10/7011* (2013.01)

(56) References Cited

U.S. PATENT DOCUMENTS

| | | | |
|---|---|---|---|
| 2003/0039887 A1* | 2/2003 | Yun et al. | 429/218.1 |
| 2004/0101763 A1* | 5/2004 | Kotato | H01M 2/0275 429/331 |
| 2005/0271943 A1* | 12/2005 | Park | C01G 45/1242 429/231.1 |
| 2006/0102455 A1* | 5/2006 | Chiang | F03G 7/005 200/181 |
| 2008/0070107 A1* | 3/2008 | Kasamatsu | H01M 2/164 429/144 |
| 2008/0113260 A1* | 5/2008 | Nansaka | H01M 10/0587 429/94 |
| 2008/0305394 A1* | 12/2008 | Hisamitsu | H01M 4/13 429/209 |
| 2009/0148759 A1* | 6/2009 | Mitsuda | H01G 9/058 429/142 |
| 2009/0167253 A1* | 7/2009 | Muraoka | H01M 10/0525 320/152 |
| 2009/0202915 A1* | 8/2009 | Modeki | H01M 4/134 429/246 |
| 2009/0246614 A1* | 10/2009 | Kim | H01M 2/145 429/145 |
| 2009/0258298 A1* | 10/2009 | Umeno et al. | 429/231.8 |
| 2010/0009265 A1* | 1/2010 | Hatayama | B01D 71/26 429/254 |
| 2010/0021822 A1* | 1/2010 | Ikemoto | H01M 2/1653 429/247 |
| 2010/0151325 A1 | 6/2010 | Kasamatsu | |
| 2010/0248001 A1* | 9/2010 | Kuze et al. | 429/144 |
| 2011/0206974 A1* | 8/2011 | Inoue | H01M 4/043 429/149 |
| 2012/0115008 A1* | 5/2012 | Sano | H01M 2/1653 429/144 |
| 2012/0295164 A1 | 11/2012 | Nakano et al. | |
| 2013/0059192 A1 | 3/2013 | Kajita et al. | |
| 2013/0157108 A1* | 6/2013 | Takamori | H01M 4/505 429/144 |

FOREIGN PATENT DOCUMENTS

| | | |
|---|---|---|
| JP | 2005317469 A2 | 11/2005 |
| JP | 2007-265666 | 10/2007 |
| JP | 2008004536 A2 | 1/2008 |
| JP | 2008277201 A2 | 11/2008 |
| JP | 2012-038655 | 2/2012 |
| JP | 2012-216426 | 11/2012 |
| JP | 2013-012351 | 1/2013 |
| JP | 2013-137984 | 7/2013 |
| WO | 2011/077564 | 6/2011 |
| WO | 2011/108119 | 9/2011 |

* cited by examiner

F I G. 7
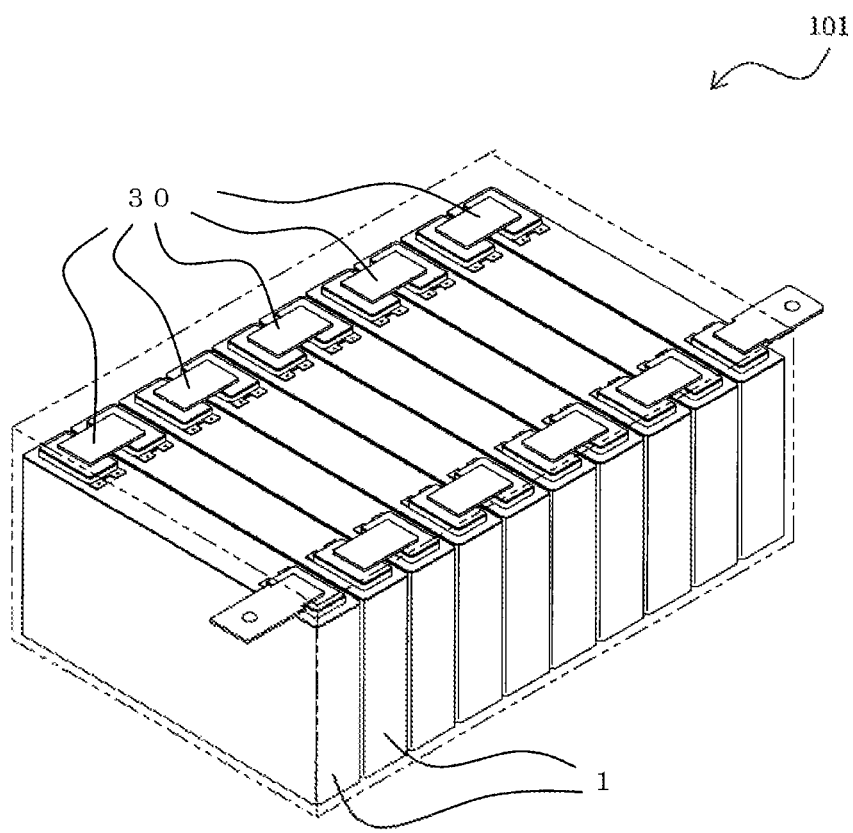

ELECTRIC STORAGE DEVICE AND ELECTRIC STORAGE APPARATUS

CROSS-REFERENCE TO RELATED APPLICATION

This application claims the benefit of Japanese Patent Application No. 2013-075202, filed on Mar. 29, 2013, which is incorporated herein by reference.

FIELD

The present invention relates to an electric storage device and an electric storage apparatus. More specifically, the present invention relates to an electric storage device and an electric storage apparatus which include a positive electrode having a positive electrode active material, a negative electrode having a negative electrode active material, and a separator interposed between the positive electrode and the negative electrode.

BACKGROUND

In recent years, rechargeable electric storage devices including battery cells such as lithium ion battery cells and nickel hydrogen battery cells, and capacitors such as electric double layer capacitors are employed as a power source for vehicles such as cars and motorcycles, and various equipment such as mobile terminals, notebook computers, etc. Such an electric storage device, for example, is disclosed in JP 2007-265666 A.

With an object of providing a non-aqueous electrolyte secondary battery cell that exhibits excellent load characteristics and cycle characteristics, using a separator that is less likely to clog, even after charge/discharge cycle is repeated, JP 2007-265666 A discloses a non-aqueous electrolyte secondary battery cell in which a separator, which is supposed to have a compressibility of 20%, has a compression resistance of 100 sec/μm or less on the membrane thickness basis. JP 2007-265666 A also discloses that the compressibility of the separator is defined as: (membrane thickness of separator before compression−membrane thickness of separator after compression)/membrane thickness of separator before compression×100, and the compression resistance of the separator is defined as (air resistance of separator after compression−air resistance of separator before compression)/(membrane thickness of separator before compression−membrane thickness of separator after compression)×100. The non-aqueous electrolyte secondary battery cell of JP 2007-265666 A uses a separator with excellent compression resistance, and therefore even when the separator is compressed due to swelling of the positive electrode and the negative electrode as the charge/discharge cycle proceeds, the air resistance of the separator is less likely to increase, so that the separator is less likely to clog. Therefore, the ion conductivity of the separator is less likely to decrease, which enables the above-mentioned object to be achieved.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The object of the above-mentioned non-aqueous electrolyte secondary battery cell of JP 2007-265666 A is to achieve excellent cycle characteristics after repetition of charge/discharge cycle. In contrast, the inventor has found a novel problem in the non-aqueous electrolyte secondary battery cell of JP 2007-265666 A that a temporary decrease in output power (which hereinafter is also referred to as a temporary deterioration) occurs immediately after the repetition of charge/discharge cycle (for example, within 2 hours after the completion of cycle). The inventors also have found that this problem is specific to electric storage devices in which charge and discharge are repeated, and is significant in non-aqueous electrolyte secondary battery cells for use in vehicles, particularly in lithium ion battery cells for hybrid cars. That is, in JP 2007-265666 A, a deterioration is caused due to swelling and shrinking of the positive electrode and the negative electrode with the charge/discharge cycle, and such a deterioration is considered to increase in a charge/discharge cycle having a wide range of SOC (State Of Charge: state of charge of a battery cell). On the other hand, as a result of studies by the inventors, it has been revealed that the temporary deterioration as a problem of the present application has characteristics of being significant in a cycle with a narrow range of SOC, and becoming more significant in a cycle at high current of 10 C (where 1 C is a rate of charge (discharge) up to a rated capacity in 1 hour) or more, and it rather recovers in a complete charge/discharge cycle at a low rate. These phenomena are different from those normally seen in cycle deterioration, which are problems of JP 2007-265666 A. As use environments under which such phenomena tend to occur, a use environment of being mounted on a vehicle and, particularly, a use environment in which high-current cycle is repeated within a narrow range of SOC as in hybrid cars can be mentioned, for example.

In view of the above-mentioned problems, it is an object of the present invention to provide an electric storage device and electric storage apparatus that reduce temporary deterioration.

As a result of extensive studies by the inventor in order to reduce such temporary deterioration, it has been found that the temporary deterioration correlates with a stress that is applied when a separator is compressed at a specific ratio. Therefore, in order to suppress the temporary deterioration, the inventor has studied further on an allowable range of the stress that is applied when the separator is compressed at the specific ratio, as a result of which the present invention has been accomplished.

That is, an electric storage device according to an aspect of an embodiment of the present invention includes: a container; an electrode assembly contained in the container, the electrode assembly including a positive electrode having a positive electrode substrate and a positive electrode active material layer formed on the positive electrode substrate, the positive electrode active material layer containing a positive electrode active material, a negative electrode having a negative electrode substrate and a negative electrode active material layer formed on the negative electrode substrate, the negative electrode active material layer containing a negative electrode active material, and a separator interposed between the positive electrode and the negative electrode; and an electrolyte contained in the container, wherein the separator is configured such that a stress that is caused at a specific compressed depth in the separator, which corresponds to 5% of the thickness of the negative electrode active material layer, is 0.5 MPa or more and 14 MPa or less.

BRIEF DESCRIPTION OF DRAWINGS

The foregoing and other features of the present invention will become apparent from the following description and drawings of an illustrative embodiment of the invention in which:

FIG. 7 is a schematic view schematically showing an appearance of an electric storage apparatus (module) according to Embodiment 2 of the present invention.

DESCRIPTION OF EMBODIMENTS

Figure 1:
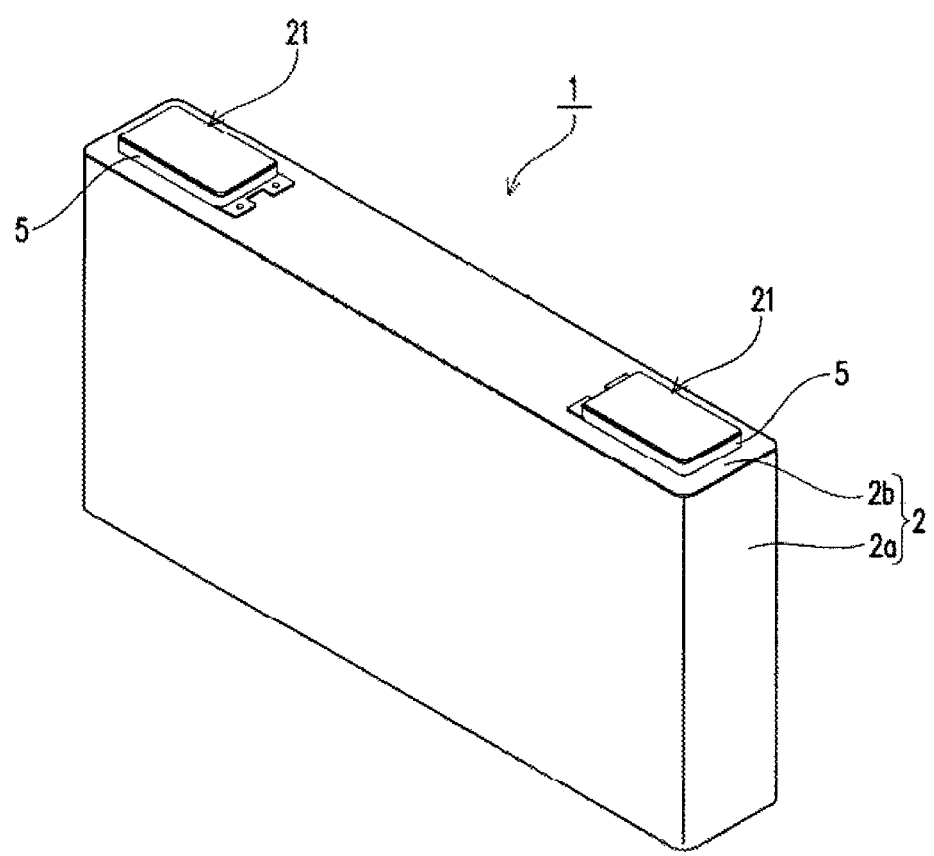
FIG. 1 is a perspective view schematically showing a non-aqueous electrolyte secondary battery cell as an example of an electric storage device according to Embodiment 1 of the present invention.

An electric storage device according to an aspect of an embodiment of the present invention includes: a container; an electrode assembly contained in the container, the electrode assembly including a positive electrode having a positive electrode substrate and a positive electrode active material layer formed on the positive electrode substrate, the positive electrode active material layer containing a positive electrode active material, a negative electrode having a negative electrode substrate and a negative electrode active material layer formed on the negative electrode substrate, the negative electrode active material layer containing a negative electrode active material, and a separator interposed between the positive electrode and the negative electrode; and an electrolyte contained in the container, wherein the separator is configured such that a stress that is caused at a specific compressed depth in the separator, which corresponds to 5% of the thickness of the negative electrode active material layer, is 0.5 MPa or more and 14 MPa or less.

As the positive electrode and the negative electrode swell and shrink in a charge/discharge cycle, the separator receives a compressive stress. However, the electric storage device of this embodiment in which the separator is configured such that a stress caused at a specific compressed depth in the separator, which corresponds to 5% of the thickness of the negative electrode active material layer, is 0.5 MPa or more and 14 MPa or less can keep the stress applied to the separator low, even if a relatively large compressive force is applied to the separator and the separator is deformed due to swelling of the negative electrode. Therefore, it can suppress the stress applied to the negative electrode and the positive electrode during use. This makes it possible to suppress the negative electrode and the positive electrode from deforming due to wrinkles, and to prevent non-uniformity in the distance between the positive electrode and the negative electrode, that is, non-uniformity in the ion conduction path in a direction of the electrode plane. Accordingly, it is possible to suppress temporary deterioration.

As has been described above, this embodiment can provide an electric storage device that reduces temporary deterioration.

According to an aspect of the above-mentioned electric storage device, the stress that is caused in the separator at the specific compressed depth is 1 MPa or more and 10 MPa or less, preferably 3 MPa or more and 5 MPa or less. This can further reduce temporary deterioration of the electric storage device.

According to an aspect of the above-mentioned electric storage device, the separator has a thickness of 15 µm or more and 25 µm or less, preferably 18 µm or more and 22 µm or less. This can further reduce temporary deterioration of the electric storage device, and can further improve the performance of the electric storage device, for example, to suppress a micro-short circuit.

According to another aspect of the above-mentioned electric storage device, the separator includes a separator substrate and an inorganic layer formed on the separator substrate, and a ratio of the thickness of the inorganic layer to the thickness of the separator substrate (Thickness of inorganic layer/Thickness of separator substrate) is 0.2 or more and less than 1. This can further reduce temporary deterioration of the electric storage device.

According to another aspect of the above-mentioned electric storage device, the above-mentioned inorganic layer has a peeling strength of 5 gf or more and 80 gf or less. This can prevent the fall-off of the inorganic layer during use without reducing ion permeability.

According to another aspect of the above-mentioned electric storage device, the separator has a restoration rate by a loading/unloading test of 2.8% or more. This can further reduce temporary deterioration of the electric storage device.

According to another aspect of the above-mentioned electric storage device, the separator has an air resistance of 30 sec/100 cc or more and 150 sec/100 cc or less. This can suppress generation of micro-short circuits and temporary deterioration, as well.

According to another aspect of the above-mentioned electric storage device, the negative electrode active material contains hard carbon. Since hard carbon is an active material that undergoes relatively small swelling and shrinking during use, it is possible to reduce the compressive stress applied to the separator. This can further reduce temporary deterioration of the electric storage device.

According to another aspect of the above-mentioned electric storage device, the negative electrode active material has a particle size of 3 µm or more and 6 µm or less. This can keep the surface of the negative electrode flat and smooth against the swelling and shrinking of the negative electrode, and thus can further suppress variation of the distance between the positive electrode and the negative electrode, that is, non-uniformity in the ion conduction path.

Accordingly, it is possible to further reduce temporary deterioration of the electric storage device.

According to another aspect of the above-mentioned electric storage device, the ratio of the electrolyte volume with respect to the total void volume (Electrolyte volume/ Total void volume of the electric storage device) is 120% or more and 180% or less. This can suppress temporary deterioration and can prevent excessive increase in weight of the electric storage device, as well.

According to another aspect of the above-mentioned electric storage device, the electrode assembly has a void ratio of 1% or more and 30% or less. This can suppress generation of wrinkles in the electrodes due to swelling and shrinking of the electrodes within a range of preventing the excessive increase in volume of the electric storage device.

Hereinafter, some aspects of embodiments of the present invention are described with reference to the drawings. In the following drawings, the same or corresponding portions are denoted by the same reference numerals, and the description thereof is not repeated.

Embodiment 1

With reference to FIG. 1 to FIG. 6, a non-aqueous electrolyte secondary battery cell 1 that is an example of an electric storage device as an embodiment of the present invention is described. The non-aqueous electrolyte secondary battery cell 1 is preferably one for use in vehicles, and more preferably one for hybrid cars.

Figure 2:
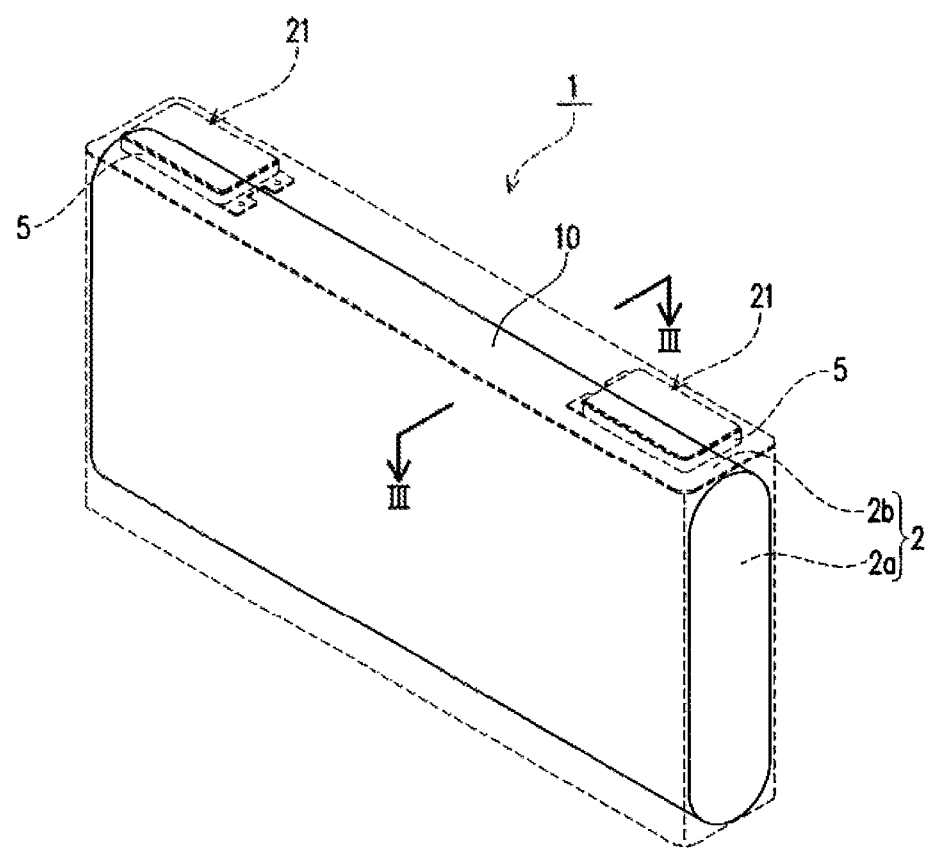
FIG. 2 is a perspective view schematically showing the inside of a container of the non-aqueous electrolyte secondary battery cell according to Embodiment 1 of the present invention.
Figure 3:
FIG. 3 is a sectional view, taken along the line in FIG. 2, schematically showing the inside of the container of the non-aqueous electrolyte secondary battery cell according to Embodiment 1 of the present invention.

As shown in FIG. 1 to FIG. 3, the non-aqueous electrolyte secondary battery cell 1 of this embodiment includes a container 2, an electrolyte contained in the container 2, outer gaskets 5 attached to the container 2, an electrode assembly 10 contained in the container 2, and external terminals 21 electrically connected to the electrode assembly 10.

As shown in FIG. 1, the container 2 has a body (case) 2a containing the electrode assembly 10, and a cover 2b covering the body 2a. The body 2a and the cover 2b are formed, for example, of stainless steel plates, and are welded to each other.

The cover 2b has two openings. Two outer gaskets 5 are arranged on the outer side of the cover 2b. One opening of the cover 2b and an opening of one of the outer gaskets 5 communicate with each other. Further, the other opening of the cover 2b and an opening of the other of the outer gaskets 5 communicate with each other. The outer gaskets 5, for example, each have a recess, and the external terminals 21 are arranged respectively in the recesses.

The external terminals 21 are connected respectively to current collectors connected to the electrode assembly 10. Although the shape of such a current collector is not specifically limited, it is a plate shape, for example. The external terminals 21, for example, are made of aluminum-based metal materials such as aluminum and aluminum alloy.

The outer gaskets 5 and the external terminals 21 include those for the positive electrode and those for the negative electrode. The outer gasket 5 and the external terminal 21 for the positive electrode are arranged on one side in the longitudinal direction of the cover 2 having a rectangular plate shape. The outer gasket 5 and the external terminal 21 for the negative electrode are arranged on the other side in the longitudinal direction of the cover 2b.

As shown in FIG. 2, an electrolyte is contained within the body 2a, and the electrode assembly 10 is immersed in the electrolyte. The electrolyte is prepared by dissolving an electrolyte salt in an organic solvent.

Examples of the organic solvent include ester-based solvents such as propylene carbonate (PC), ethylene carbonate (EC), dimethyl carbonate (DMC), and ethyl methyl carbonate (EMC), and an organic solvent obtained by mixing an ether solvent such as diethoxyethane (DEE) with an ester-based solvent such as γ-butyrolactone (γ-BL).

Further, examples of the electrolyte salt include lithium salts such as lithium perchlorate ($LiClO_4$), lithium borofluoride ($LiBF_4$), and lithium hexafluorophosphate ($LiPF_6$). Furthermore, a known additive may be added thereto as an additive.

As shown in FIG. 2 and FIG. 3, the electrode assembly 10 is contained within the body 2a. The container 2 may contain one electrode assembly or may contain a plurality of electrode assemblies. In the latter case, the plurality of electrode assemblies 10 are electrically connected in parallel to each other.

Figure 4:
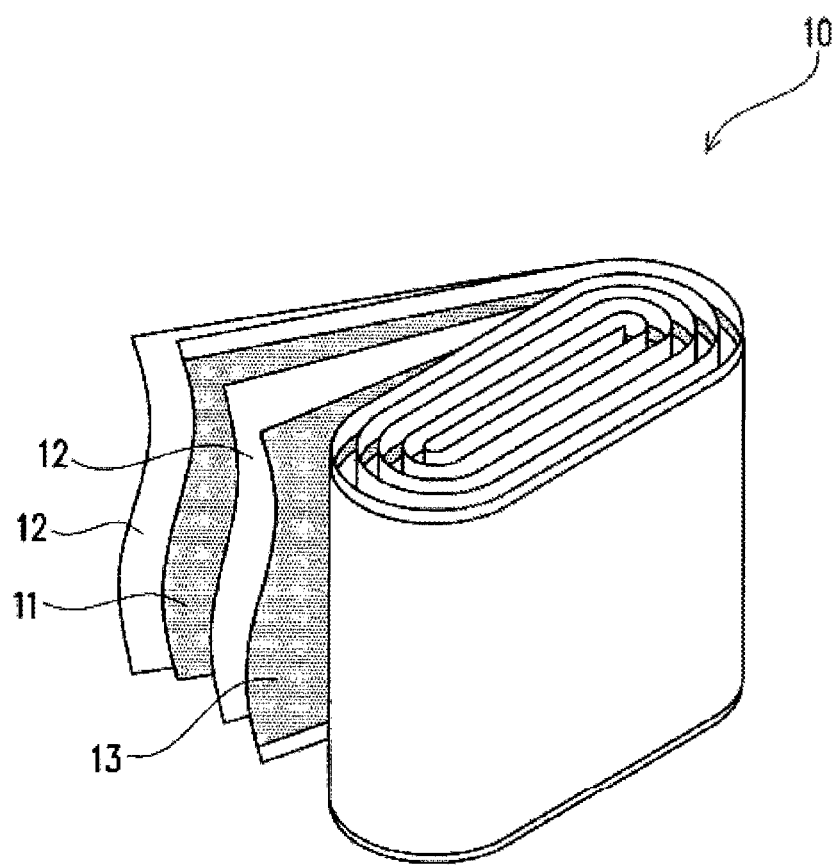
FIG. 4 is a pattern diagram schematically showing an electrode assembly that constitutes the non-aqueous electrolyte secondary battery cell according to Embodiment 1 of the present invention.

As shown in FIG. 4, the electrode assembly 10 includes a positive electrode 11, a separator 12, and a negative electrode 13. The electrode assembly 10 is formed by winding the separator 12 disposed on the negative electrode 13, the positive electrode 11 disposed on the separator 12, and the separator 12 disposed on the positive electrode 11 together into a roll. That is, in the electrode assembly 10, the separator 12 is formed on the outer circumference side of the negative electrode 13, the positive electrode 11 is formed on the outer circumference side of the separator 12, and the separator 12 is formed on the outer circumference side of the positive electrode 11. In this embodiment, such an insulating separator is disposed between the positive electrode 11 and the negative electrode 13 in the electrode assembly 10, and therefore the positive electrode 11 and the negative electrode 13 are not electrically connected to each other.

Figure 5:
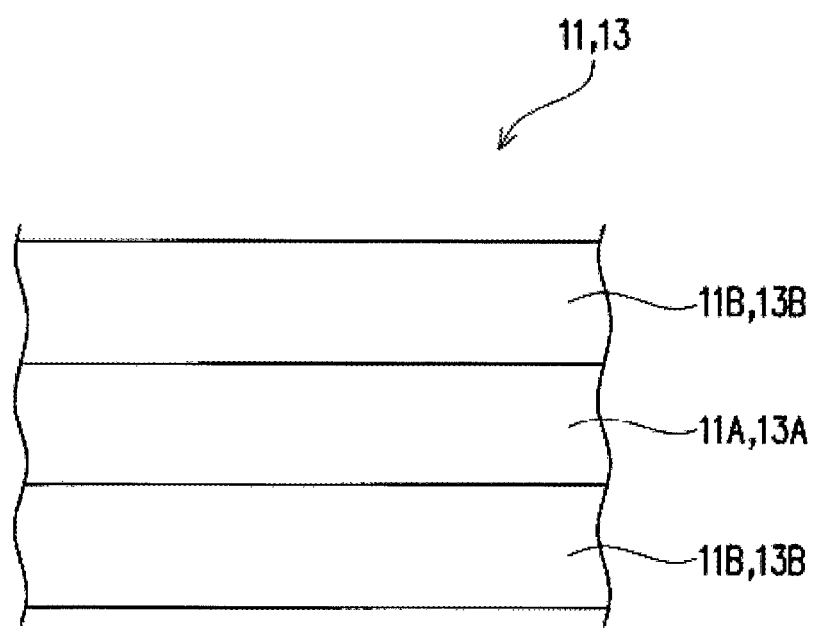
FIG. 5 is an enlarged pattern diagram (sectional view) schematically showing a positive electrode or a negative electrode that constitutes the electrode assembly according to Embodiment 1 of the present invention.

As shown in FIG. 5, the positive electrode 11 that constitutes the electrode assembly 10 has a positive electrode current collector foil 11A, and a positive electrode active material layer 11B formed on the positive electrode current collector foil 11A. The negative electrode 13 that constitutes the electrode assembly 10 has a negative electrode current collector foil 13A, and a negative electrode active material layer 13B formed on the negative electrode current collector foil 13A. In this embodiment, the positive electrode active material layer 11B and the negative electrode active material layer 13B are formed respectively on each of the front and back sides of the positive electrode current collector foil 11A and the negative electrode current collector foil 13A. However, the present invention is not specifically limited to such a structure. For example, the positive electrode active material layer 11B and the negative electrode active material layer 13B may be formed respectively on the front or back side of the positive electrode current collector foil 11A and the negative electrode current collector foil 13A. However, the positive electrode active material layer 11B and the negative electrode active material layer 13B face each other.

In this embodiment, a positive electrode current collector foil and a negative electrode current collector foil are described as an example of a positive electrode substrate and a negative electrode substrate. However, the shape of the positive electrode substrate and the negative electrode substrate of the present invention is not limited to such a foil shape.

The positive electrode active material layer 11B has a positive electrode active material, a conductive additive, and a binder. The negative electrode active material layer 13B has a negative electrode active material and a binder. The negative electrode active material layer 13B may further have a conductive additive. The thickness of the negative electrode active material layer 13B is preferably 20 μm or more and 80 μm or less.

The positive electrode active material is preferably lithium composite oxide, though not specifically limited thereto. Particularly, the positive electrode active material is more preferably lithium composite oxide represented by: $Li_aNi_bM1_cM2_dW_xNb_yZr_zO_2$ (where a, b, c, d, x, y, and z satisfy $0 \leq a \leq 1.2$, $0 \leq b \leq 1$, $0 \leq c \leq 0.5$, $0 \leq d \leq 0.5$, $0 \leq x \leq 0.1$, $0 \leq y \leq 0.1$, $0 \leq z \leq 0.1$, and b+c+d=1, and M1 and M2 are at least one element selected from the group consisting of Mn, Ti, Cr, Fe, Co, Cu, Zn, Al, Ge, Sn, and Mg).

The negative electrode active material contains hard carbon. The negative electrode active material preferably consists of hard carbon. In the case where the negative electrode active material contains hard carbon and other materials, examples of such other materials include carbon materials and other elements that can be alloyed with lithium, alloys, metal oxides, metal sulfides, and metal nitrides.

Examples of the carbon materials include hard carbon, soft carbon, and graphite.

Examples of the elements that can be alloyed with lithium include Al, Si, Zn, Ge, Cd, Sn, and Pb. One of these may be contained alone, or two or more of these may be contained therein.

Further, examples of the alloys include alloys containing a transition metal element such as Ni—Si alloy and Ti—Si alloy.

Examples of the metal oxides include amorphous tin oxides such as $SnB_{0.4}P_{0.6}O_{3.1}$, silicon tin oxides such as $SnSiO_3$, silicon oxides such as SiO, and lithium titanate having a spinel structure such as $Li_{4+x}Ti_5O_{12}$.

Examples of the metal sulfides include lithium sulfides such as $TiS_2$, molybdenum sulfides such as $MoS_2$, and iron sulfides such as FeS, $FeS_2$, and $Li_xFeS_2$.

Among these, the negative electrode active material is particularly preferably hard carbon, above all, hard carbon having a D 50 particle size of less than 8 μm.

The negative electrode active material preferably has a particle size of 3 μm or more and 6 μm or less, more preferably has a particle size of 3 μm or more and 5 μm or less. This can further reduce temporary deterioration and improve initial Coulomb efficiency, as well.

The above-mentioned particle size of the negative electrode active material shows a particle size (D50) that corresponds to 50% volume in the particle volume distribution determined by laser diffraction light-scattering.

The binder is not specifically limited, but examples thereof include polyacrylonitrile, polyvinylidene fluoride (PVDF), a copolymer of vinylidene fluoride and hexafluoropropylene, polytetrafluoroethylene, polyhexafluoropropylene, polyethylene oxide, polypropylene oxide, polyphosphazen, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, and polycarbonate.

Particularly, in view of electrochemical stability, the binder is preferably at least one of polyacrylonitrile, polyvinylidene fluoride, polyhexafluoropropylene, and polyethylene oxide, more preferably at least one of PVDF, polyacrylic acid, polymethacrylic acid, and styrene-butadiene rubber.

The separator 12 is disposed between the positive electrode 11 and the negative electrode 13, and it allows the electrolyte to pass therethrough, while blocking electrical connection between the positive electrode 11 and the negative electrode 13.

The separator 12 is formed such that a stress caused at a specific compressed depth (5% compressed depth) which corresponds to 5% of the thickness of the negative electrode active material layer is 0.5 MPa or more and 14 MPa or less. This stress is preferably 1 MPa or more and 14 MPa or less, more preferably 1 MPa or more and 10 MPa or less, further preferably 3 MPa or more and 5 MPa or less. This can reduce temporary deterioration of the non-aqueous electrolyte secondary battery cell 1. Such a numerical range of the stress is preferably set in consideration of incidence of micro-short circuits, which will be described in Examples below.

Here, a thickness Ln of the negative electrode active material layer 13B is determined by measuring the thickness of the negative electrode 13, and the thickness of the negative electrode 13 from which the negative electrode active material layer 13B has been peeled off, and calculating the difference therebetween. In the case where the negative electrode active material layer 13B is formed on each of both sides of the negative electrode current collector foil 13A, the thickness Ln of the negative electrode active material layer 13B is an average of the thickness of the negative electrode active material layers 13B determined as above. The thickness of each negative electrode active material layer 13B is determined by averaging values of the thickness that are measured at multiple points.

The stress caused at a specific compressed depth in the separator, which corresponds to 5% of the thickness (Ln) of the negative electrode active material layer 13B is determined as follows. The separator is subjected to a loading/unloading test using a loading/unloading testing machine (MCT-211, manufactured by SHIMADZU CORPORATION) with a cylindrical indenter (that is circular with a compression surface of a 50-μm diameter). A stress Fb (the above-mentioned stress) is calculated from a testing load Fa that is applied at a depth Ln/20 (5% compressed depth), taking a position at which a minimum testing load of 5 mN is applied as a loading displacement starting position, by the following formula 1.

$$Fb = Fa/S/a [MPa] \quad \text{(formula 1)},$$

where the unit of Fa is N, the unit of S is a square of m, and a is a coefficient (a=1.61). Further, S denotes the contact area of the indenter.

The above-mentioned stress can be adjusted, for example, by changing the void ratio of the separator 12.

Further, in the case where the separator 12 includes a separator substrate 12A, and an inorganic layer 12B formed on one surface of the separator substrate 12A, as will be described later, the above-mentioned stress can be adjusted, for example, by changing the draw ratio of a polyolefin porous film that constitutes the separator substrate 12A when producing the separator 12. Further, the above-mentioned stress can be adjusted also by changing the content of a plasticizer (which will be described later) used for producing the separator substrate 12A, for example. Further, the above-mentioned stress can be adjusted also by changing the volume of inorganic particles (which will be described later) as a component of the inorganic layer 12B, for example.

The separator 12 preferably has a thickness of 15 μm or more and 25 μm or less, more preferably 18 μm or more and 22 μm or less. This can further reduce temporary deterioration of the non-aqueous electrolyte secondary battery cell 1 and further improve the performance thereof to suppress micro-short circuits, etc., as well.

Here, the above-mentioned thickness of the separator 12 is a value measured using a micrometer (manufactured by MITSUTOYO Corporation).

The separator 12 preferably has a restoration rate by the loading/unloading test of 1.8% or more, more preferably 2.3% or more, further preferably 2.8% or more. The maximum value of the restoration rate by the loading/unloading test, for example, is 4.6%. This accelerates the elimination of deformation of the separator 12 against the charge/discharge cycle. Therefore, it is possible to maintain the strength of the separator 12, while reducing the temporary deterioration at the same time.

Here, the restoration rate is a value measured as follows. A loading/unloading test is conducted using a loading/unloading testing machine (MCT-211, manufactured by SHIMADZU CORPORATION) with a cylindrical indenter having a contact surface of a 50-μm diameter. The position at which a minimum testing load of 5 mN is applied is specified as a loading displacement starting position. Further, after a compressive load has been applied, the position at which a minimum testing load of 5 mN is applied is specified as an unloading displacement ending position. Further, the position at which a maximum testing load of 50 mN is applied is specified as a load/unload switch position. When the difference between the load/unload switch position and the loading displacement starting position is denoted by La, the difference between the unloading displacement ending position and the loading displacement starting position is denoted by Lb, and the thickness of the separator 12 is denoted by Lc, a restoration rate R of the separator is determined by the following formula 2.

$$R=(La-Lb)/Lc \times 100 \quad \text{(formula 2)}$$

The above-mentioned restoring force can be adjusted, for example, by adjusting the fiber diameter of the porous film.

The separator 12 preferably has an air resistance of 30 sec/100 cc or more and 150 sec/100 cc or less, more preferably 50 sec/100 cc or more and 120 sec/100 cc or less. This can suppress temporary deterioration, while suppressing generation of micro-short circuits at the same time.

The above-mentioned air resistance means a time necessary for permeation of a specific volume of a gas. The air resistance is a value measured according to JIS P8117 set forth in Japanese Industrial Standards (JIS).

Figure 6:
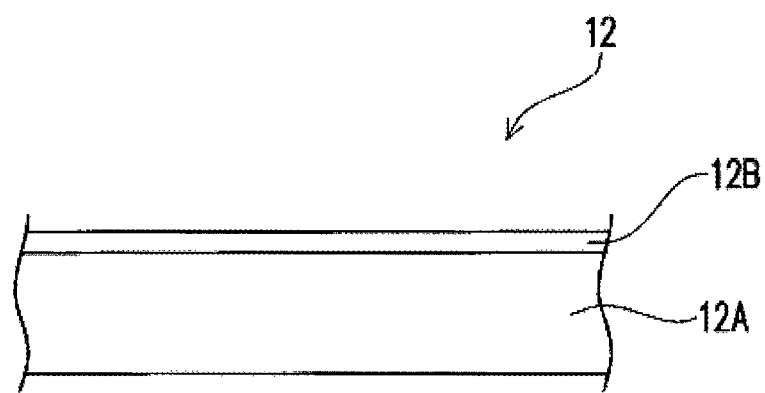
FIG. 6 is an enlarged pattern diagram (sectional view) schematically showing a separator that constitutes the electrode assembly according to Embodiment 1 of the present invention.

The separator 12 may be composed of a single layer, but preferably includes the separator substrate 12A, and the inorganic layer 12B formed on one surface of the separator substrate 12A, as shown in FIG. 6. It is effective to reduce the air resistance (increase the permeation) in order to obtain battery cells with high output power and resistance to temporary deterioration. However, in the case where a thermoplastic resin is used as the separator, the separator with an increased permeation tends to have large thermal shrinkage, which may result in a reduction in the safety when used in a battery cell. Providing the inorganic layer 12B on the separator substrate 12A using a technique such as coating can suppress the thermal shrinkage of the separator. Accordingly, the separator 12 including the separator substrate 12A and the inorganic layer 12B is desirable, since it enables an improvement in the safety of the battery cell.

In this case, the separator substrate 12A is not specifically limited, and general resin porous films can be used as the separator substrate 12A. Examples of the separator substrate 12A that can be used include a woven fabric and nonwoven fabric of synthetic fibers, natural fibers, hydrocarbon fibers, glass fibers, and ceramic fibers. It is preferable that the separator substrate 12A contain a woven fabric or nonwoven fabric, and it is more preferable that the separator substrate 12A contain a woven fabric or nonwoven fabric of synthetic fibers, or be such a woven fabric or nonwoven fabric. The synthetic fibers that constitute the separator substrate 12A preferably contain polyacrylonitrile (PAN), polyamide (PA), polyester such as polyethylene terephthalate (PET), polyolefin (PO) such as polypropylene (PP) and polyethylene (PE), or non-conductive synthetic fibers selected from mixtures of such polyolefins.

Further, the separator substrate 12A, for example, is a microporous polyolefin film, a fleece, or paper, and is preferably a microporous polyolefin film (porous polyolefin layer). As a porous polyolefin layer, polyethylene, polypropylene, or a composite film of these can be used.

In view of effects on battery characteristics, the thickness of the separator substrate 12A is preferably 11 μm or more and 24 μm or less, for example.

Further, the inorganic layer 12B is referred to also as an inorganic coating layer, and contains inorganic particles, a binder, etc.

The inorganic particles are not specifically limited, but are preferably composed of at least one of the following inorganic materials exclusively, or a mixture or a composite compound of these materials.

Specifically, examples of the inorganic particles include fine particles of oxide such as iron oxide, $SiO_2$, $Al_2O_3$, $TiO_2$, $BaTiO_2$, ZrO, and alumina-silica composite oxide; fine particles of nitride such as aluminum nitride and silicon nitride; fine particles of ionic crystal with poor solubility such as calcium fluoride, barium fluoride, and barium sulfate; fine particles of covalent crystal such as silicon and diamond; fine particles of clay such as talc and montmorillonite; and materials derived from mineral resources such as boehmite, zeolite, apatite, kaolin, mullite, spinel, olivine, sericite, bentonite, and mica, and their artificial materials.

Further, the inorganic layer 12B may contain fine particles that are made to have electrically insulating properties by subjecting the surface of conductive fine particles such as: fine particles of metal; fine particles of oxide such as $SnO_2$ and tin-indium oxide (ITO); and fine particles of carbon such as carbon black and graphite, to a surface treatment with a material having electrically insulating properties (for example, a material that constitutes the above-mentioned electrically insulating inorganic particles). The inorganic particles are preferably $SiO_2$, $Al_2O_3$, or alumina-silica composite oxide.

The binder contained in the inorganic layer 12B is the same as the binders contained in the positive electrode and the negative electrode, and therefore the description thereof is not repeated.

The inorganic layer 12B preferably has a peeling strength of 5 gf or more and 80 gf or less, more preferably 8 gf or more and 60 gf or less. This can prevent the fall-off of the inorganic layer 12B during use without reducing the ion permeability of the separator 12.

Here, the above-mentioned peeling strength of the inorganic layer 12B is an average force (gf) during the time when a mending tape (3M, Scotch tape, 15-mm width) attached to the surface of the inorganic layer 12B is peeled (the inorganic layer 12B is peeled from the separator substrate 12A) according to a 180-degree tape peel test (JIS K 6854-2).

A ratio of the thickness of the inorganic layer 12B with respect to the thickness of the separator substrate 12A (Thickness of the inorganic layer 12B/Thickness of the separator substrate 12A) is preferably 0.2 or more and less than 1, more preferably 0.3 or more and less than 1, further preferably 0.4 or more and 0.8 or less. This can further reduce the temporary deterioration.

Here, the above-mentioned ratio of the thickness of the inorganic layer 12B with respect to thickness of the separator substrate 12A is a value measured as follows. A cross section in the thickness direction of the separator 12 is exposed using a technique such as ion milling, and an image of the cross section is captured using a scanning electron microscope (SEM). Then, a ratio D of the thickness of the inorganic layer 12B with respect to the thickness L of the separator 12 is determined therefrom. From the thickness L of the separator 12 and the ratio D of the inorganic layer 12B, the thickness of the inorganic layer 12B is calculated by Lm=L×D.

Further, each of the separator substrate 12A and the inorganic layer 12B may be composed of a single layer, or may be composed of a plurality of layers.

A ratio of the electrolyte volume with respect to the total void volume of the non-aqueous electrolyte secondary battery cell 1 (Electrolyte volume/Total void volume) is preferably 120% or more and 180% or less, more preferably 125% or more and 165% or less. This can prevent excessive increase in weight of the non-aqueous electrolyte secondary battery cell 1 while suppressing the temporary deterioration at the same time.

Here, the above-mentioned total void volume of the non-aqueous electrolyte secondary battery cell 1 is a value measured as follows. The non-aqueous electrolyte secondary battery cell 1 is disassembled to remove the positive electrode 11, the separator 12, and the negative electrode 13, which are washed with DMC (dimethyl carbonate), followed by drying. Thereafter, a pore volume within a specified area S of each of: a region in which the positive electrode active material layer is formed (regions on both sides when the positive electrode active material layer is formed on each of both sides); a region in which the negative electrode active material layer is formed (regions on both sides when the negative electrode active material layer is formed on each of both sides); and the separator 12 is measured using a mercury porosimeter. The pore volume of the positive electrode 11 is denoted by Vp, the pore volume of the negative electrode is denoted by Vn, and the pore volume of the separator is denoted by Vs. When the area of the region in which the positive electrode active material layer is formed is denoted by Sp, the area of the region in which the negative electrode active material layer is formed is denoted by Sn, and the area of the separator is denoted by Ss, in the non-aqueous electrolyte secondary battery cell 1, the pore volume (Va) of the non-aqueous electrolyte secondary battery cell 1 is determined by the following formula 3.

$$Va=(Vp \times Sp/S)+(Vn \times Sn/S)+(Vs \times Ss/S) \quad \text{(formula 3)}$$

In the case where the non-aqueous electrolyte secondary battery cell 1 includes a plurality of electrode assemblies 10, the total void volume (total pore volume) amounts to a total of values of the plurality of electrode assemblies 10.

Further, the electrolyte volume is a value measured as follows. When the total value of weight of all components before disassembling the non-aqueous electrolyte secondary battery cell 1 is denoted by Ma, and the total value after the disassembling and washing with DMC is denoted by Mb, the electrolyte volume (Vb) is determined by the following formula 4.

$$Vb=(Ma-Mb)/1.2 \quad \text{(formula 4)}$$

The ratio of the electrolyte volume with respect to the total pore volume of the non-aqueous electrolyte secondary battery cell 1 is a value obtained by: Electrolyte volume/Total pore volume (%).

The electrode assembly 10 preferably has a void ratio of 1% or more and 30% or less, more preferably 1% or more and 10% or less. This can suppress generation of wrinkles in the electrodes due to swelling and shrinking of the electrodes, within the range capable of preventing excessive increase in the volume of the non-aqueous electrolyte secondary battery cell 1.

Here, the above-mentioned void ratio is a value measured as follows. An X-ray CT image of the non-aqueous electrolyte secondary battery cell 1 is non-destructively captured in the winding cross-sectional direction (from one side to the other side in the winding axis direction), and a thickness La of the electrode assembly 10 and a length Lb in the thickness direction of void portions at the center of winding are measured, from which a void ratio Rv (%) is determined by the following formula 5.

$$Rv=Lb/La \times 100 \quad \text{(formula 5)}$$

Subsequently, a method for producing the non-aqueous electrolyte secondary battery cell 1 in this embodiment is described.

First, the electrode assembly 10 is described.

A positive electrode active material, a conductive additive, and a binder are mixed. This mixture is added to a solvent and kneaded. Thus, a positive electrode mixture is prepared. The positive electrode mixture is applied to at least one surface of the positive electrode current collector foil 11A, followed by drying, which is thereafter subjected to compression molding. Thus, the positive electrode 11 in which the positive electrode active material layer 11B is formed on the positive electrode current collector foil 11A is produced. After the compression molding, vacuum drying is conducted.

On the other hand, a negative electrode active material containing hard carbon is mixed with a binder. This mixture is added to a solvent and kneaded. Thus, a negative electrode mixture is prepared. The negative electrode mixture is applied to at least one surface of the negative electrode current collector foil 13A, followed by drying, which is thereafter subjected to compression molding. Thus, the negative electrode 13 in which the negative electrode active material layer 13B is formed on the negative electrode current collector foil 13A is produced. After the compression molding, vacuum drying is conducted.

When producing the separator 12, the inorganic layer 12B is formed, for example, by applying a coating agent onto the separator substrate 12A produced above.

Specifically, the separator substrate 12A is produced, for example, as follows. Low density polyethylene and a plasticizer are mixed. The mixture is melted and kneaded in an extruder to the tip of which a T-die is attached. Then, the kneaded mixture is extruded, thereby forming a sheet. This sheet is immersed in a solvent such as diethyl ether, so that the plasticizer is extracted and removed, followed by drying. Thus, a porous film before drawing is obtained. This porous film is drawn in biaxial directions within a heated bath, which is thereafter subjected to heat treatment. Thus, the separator substrate 12A is produced.

The inorganic layer 12B is produced, for example, as follows. Inorganic particles such as alumina particles, a binder such as SBR, and a thickener such as CMC are mixed with a solvent such as ion-exchanged water, with which a surfactant is further mixed. Thus, a coating agent is prepared.

Next, the coating agent is applied to the separator substrate 12A, for example, by gravure coating, followed by drying. Thus, a separator including the separator substrate 12A, and the inorganic layer 12B formed on the separator substrate 12A is produced. The surface of the separator substrate 12A may be subjected to a treatment for modification.

From separators as produced above, those having a stress of 0.5 MPa or more and 14 MPa or less at a specific compressed depth that corresponds to 5% of the thickness of the negative electrode active material layer are selected as the separator 12 of this embodiment.

Next, the positive electrode 11 and the negative electrode 13 are wound with the separator 12 interposed therebetween. At this time, the inorganic layer 12B of the separator 12 is preferably opposed to the positive electrode 11. Thus, the electrode assembly 10 is produced. Thereafter, current collectors are attached respectively to the positive electrode and the negative electrode.

Next, the electrode assembly 10 is arranged inside the body 2a of the container 2. In the case where a plurality of electrode assemblies 10 are provided, the electrode assemblies 10 are arranged inside the body 2a with their current collectors being electrically connected in parallel. Subsequently, the current collectors are welded respectively to the external terminals 21 within the outer gaskets 5 on the cover 2b, and the cover 2b is attached to the body 2a.

Next, electrolyte is poured therein. The electrolyte is not specifically limited. However, the electrolyte is prepared, for example, by adding $LiPF_6$ to a mixed solvent of propylene carbonate (PC):dimethyl carbonate (DMC):ethyl methyl carbonate (EMC)=3:2:5 (volume ratio). A known additive may be further added thereto. The non-aqueous electrolyte secondary battery cell 1 in this embodiment shown in FIG. 1 to FIG. 6 is produced by the aforementioned steps.

As has been described above, the non-aqueous electrolyte secondary battery cell 1 as an example of an electric storage device in this embodiment includes: a container; an electrode assembly contained in the container; and an electrolyte contained in the container, wherein the electrode assembly includes the positive electrode 11 having a positive electrode substrate and the positive electrode active material layer 11B formed on the positive electrode substrate, the positive electrode active material layer 11B containing a positive electrode active material, the negative electrode 13 having a negative electrode substrate and the negative electrode active material layer 13B formed on the negative electrode substrate, the negative electrode active material layer 13B containing a negative electrode active material, and the separator 12 interposed between the positive electrode 11 and the negative electrode 13 wherein the separator 12 is configured such that a stress that is caused at a specific compressed depth, which corresponds to 5% of the thickness of the negative electrode active material layer 13B, is 0.5 MPa or more and 14 MPa or less.

According to the non-aqueous electrolyte secondary battery cell 1 of an aspect of this embodiment, the stress caused at a specific compressed depth in the separator 12, which corresponds to 5% of the thickness of the negative electrode active material layer 13B, is 0.5 MPa or more and 14 MPa or less, and therefore it is possible to suppress the pores of the separator 12 from being buried even when the separator 12 is deformed with swelling and shrinking of the negative electrode 13 due to the charge/discharge cycle of the non-aqueous electrolyte secondary battery cell 1. In this regard, the negative electrode 13 swells and shrinks more than the positive electrode 11. Therefore, the stress to be applied to the negative electrode 13 and the positive electrode 11 during use can be suppressed. This makes it possible to suppress wrinkles and deformation in the negative electrode 13 and the positive electrode 11. Further, it is made possible to prevent non-uniformity in the distance between the positive electrode and the negative electrode, that is, non-uniformity in the ion conduction path in a direction of the electrode plane. Accordingly, a decrease in output power (temporary deterioration) can be reduced.

The temporary deterioration is significant in non-aqueous electrolyte secondary battery cells for use in vehicles. Temporary deterioration is such a problem that is particularly significant in lithium ion battery cells for hybrid cars that are assumed to be used in a manner such that high current cycle is repeated in a narrow SOC range. Accordingly, the non-aqueous electrolyte secondary battery cell 1 of this embodiment is suitably used in lithium ion battery cells for hybrid cars. It should be noted that the non-aqueous electrolyte secondary battery cell 1 of this embodiment is generally used in applications in which charge and discharge are repeated.

In the non-aqueous electrolyte secondary battery cell 1 in this embodiment, it is preferable that the negative electrode active material contain hard carbon. Further, in the non-aqueous electrolyte secondary battery cell 1 in this embodiment, it is more preferable that the negative electrode active material be hard carbon. Since hard carbon is an active material that undergoes relatively small swelling and shrinking during use, it is possible to reduce the compressive stress applied to the separator. Accordingly, hard carbon can suppress temporary deterioration more effectively than other materials.

Although a non-aqueous electrolyte secondary battery cell exemplified as an electric storage device has been described in this embodiment, the present invention is not limited to such a non-aqueous electrolyte secondary battery cell. The present invention is also applicable to capacitors or the like. In the case where the present invention is used for a non-aqueous electrolyte secondary battery cell, the non-aqueous electrolyte secondary battery cell is suitably a lithium ion secondary battery cell. In the case where the present invention is used for a capacitor, the capacitor is suitably a lithium ion capacitor or an ultracapacitor.

Embodiment 2

An electric storage apparatus (electric storage device module) according to an aspect of this embodiment includes a plurality of electric storage devices as exemplified above. It further includes a plurality of bus bar members 30 that electrically connect the electric storage devices to each other.

FIG. 7 shows an example of an electric storage apparatus 101 of this embodiment.

In the electric storage apparatus 101 of this embodiment, a plurality of electric storage devices 1 (non-aqueous electrolyte secondary battery cells 1) formed into a rectangular shape as seen from above are arranged, for example, to be aligned in the short direction of the electric storage devices 1 as seen from above.

Further, the electric storage devices 1 that are adjacent to each other are in contact with each other.

In the electric storage apparatus 101, the electric storage devices 1 that are adjacent to each other are electrically connected to each other in series by one bus bar member 30.

The electric storage apparatus 101 is configured so that charge and discharge are performed by all the electric storage devices 1 that constitute a module.

The electric storage apparatus of this embodiment includes the electric storage devices that can reduce temporary deterioration, as mentioned above. Accordingly, the electric storage apparatus can suppress temporary deterioration. That is, in the electric storage apparatus, charge and discharge can be performed at a high rate while temporary deterioration is suppressed. Accordingly, it is suitable that the electric storage apparatus of this embodiment be mounted on hybrid cars in which charge and discharge are performed at a high rate.

Embodiment 3

An in-vehicle electric storage system according to an aspect of an embodiment of the present invention includes the above-mentioned electric storage devices, and a control unit that controls charge and discharge of the electric storage devices.

Figure 8:
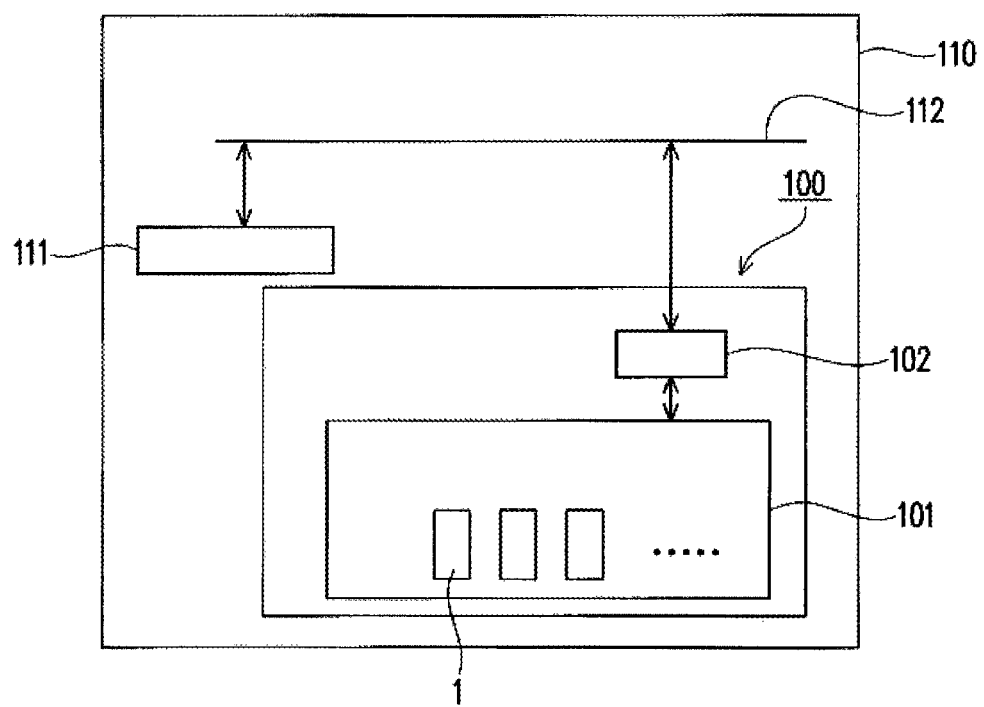
FIG. 8 is a pattern diagram showing a storage battery system according to Embodiment 3 of the present invention when it is mounted on a vehicle.

Specifically, as shown in FIG. 8, an in-vehicle electric storage system 100 in this embodiment includes the non-aqueous electrolyte secondary battery cell 1 as an electric storage device of Embodiment 1, and a control unit 102 that controls charge and discharge of the non-aqueous electrolyte secondary battery cell 1. Specifically, the in-vehicle electric storage system 100 includes the electric storage apparatus (electric storage device module) 101 having a plurality of non-aqueous electrolyte secondary battery cells 1, and the control unit 102 that performs charge and discharge of the non-aqueous electrolyte secondary battery cells at a high rate and controls the charge and discharge.

In the case where the in-vehicle electric storage system 100 is mounted on a vehicle 110, as shown in FIG. 8, the control unit 102 is connected to a vehicle control unit 111 that controls engines, motors, drive systems, electrical systems, and the like, via an in-vehicle communication network 112 such as in-vehicle LAN and CAN. The control unit 102 and the vehicle control unit 111 communicate with each other, and the electric storage system 100 is controlled on the basis of the information obtained from the communication. Thus, a vehicle provided with the electric storage system 100 can be implemented.

As has been described above, the in-vehicle electric storage system of this embodiment includes the electric storage devices capable of reducing temporary deterioration. Accordingly, the in-vehicle electric storage system can suppress temporary deterioration. That is, the in-vehicle electric storage system enables charge and discharge to be performed at a high rate while temporary deterioration is suppressed. Accordingly, it is suitable that the in-vehicle electric storage system be mounted on hybrid cars in which charge and discharge are performed at a high rate.

EXAMPLES

In these examples, advantageous effects to be obtained by a stress caused at a specific compressed depth in the separator, which corresponds to 5% of the thickness of the negative electrode active material layer, falling within a specific range were investigated.

First of all, the methods used for measuring various values in the examples and the comparative examples are described below.

(Thickness of Negative Electrode Active Material Layer)

The thickness Ln of the negative electrode active material layer 13B (thickness of an active material layer on one side) was determined by measuring the thickness of the negative electrode 13 having the negative electrode active material layer 13B on each of both sides and the thickness of the negative electrode 13 from which the negative electrode active material layers 13B were peeled off, and dividing the difference therebetween by two. Their thickness was measured using a micrometer (manufactured by Mitutoyo Corporation).

(5% Compressive Stress)

A separator was subjected to a loading/unloading test using a loading/unloading testing machine (MCT-211, manufactured by SHIMADZU CORPORATION) with a cylindrical indenter (that is circular with a compression surface of a 50-μm diameter). A stress Fb was calculated from a testing load Fa applied at a depth Ln/20 (5% compressed depth), taking a position at which a minimum testing load of 5 mN is applied as a loading displacement starting position, by the above formula 1. This stress Fb is a stress caused at a specific compressed depth in the separator, which corresponds to 5% of the thickness (Ln) of the negative electrode active material layer 13B. The stress Fb is shown as 5% compressive stress in Table 1.

(Thickness of Separator)

The thickness of a separator was measured using a micrometer (manufactured by Mitutoyo Corporation). In the case where the separator was composed of two layers, the total thickness of a separator substrate and an inorganic layer formed on the separator substrate was taken as the thickness of the separator.

(Thickness of Inorganic Layer/Thickness of Separator Substrate)

A ratio of the inorganic layer 12B with respect to the separator substrate 12A (Thickness of inorganic layer/Thickness of separator substrate) was measured as follows. A cross section in the thickness direction of the separator 12 was exposed using a technique such as ion milling, and an image of the cross section was captured using a scanning electron microscope (SEM). Then, a ratio D of the thickness of the inorganic layer with respect to the thickness of the separator 12 was determined therefrom. From the thickness L of the separator 12 and the ratio D of the inorganic layer 12B, the thickness Lm of the inorganic layer 12B was calculated by Lm=L×D.

(Restoration Rate of Separator)

A restoration rate of a separator was measured as follows.

A separator was subjected to a loading/unloading test using a loading/unloading testing machine (MCT-211, manufactured by SHIMADZU CORPORATION) with a cylindrical indenter having a contact surface of a 50-μm diameter. The position at which a minimum testing load of 5 mN was applied was specified as a loading displacement starting position. Further, after a compressive load was applied, the position at which a minimum testing load of 5 mN was applied was specified as an unloading displacement ending position. Further, the position at which a maximum testing load of 50 mN was applied was specified as a load/unload switch position. When the difference between the load/unload switch position and the loading displacement starting position was denoted by La, the difference between the unloading displacement ending position and the loading displacement starting position was denoted by Lb, and the thickness of the separator was denoted by Lc, a restoration rate R of the separator was determined by the above formula 2.

(Particle Size of Negative Electrode Active Material)

For determining the particle size of the negative electrode active material, the particle volume distribution was determined by a laser diffraction light-scattering method. When 50% volume (cumulative distribution) of particles had a specific particle size or smaller, the specific particle size was taken as an average particle size D50.

(Void Ratio of Electrode Assembly)

An X-ray CT image of the non-aqueous electrolyte secondary battery cell 1 was non-destructively captured in the winding cross-sectional direction (that is, from one side to the other side in the winding axis direction), and the thickness La of the electrode assembly 10 and the length Lb in the thickness direction of void portions at the center of winding were measured, from which a void ratio Rv (%) was determined by the above formula 5.

Example 1

<Positive Electrode>

$Li_{1.1}Ni_{0.33}Co_{0.33}Mn_{0.33}O_2$ as a positive electrode active material, acetylene black as a conductive additive, and PVDF as a binder were mixed at a ratio of 90:5:5. To this mixture was added N-methylpyrrolidone (NMP) as a solvent. Thus, a positive electrode mixture was prepared. This positive electrode mixture was applied to each of both sides of an Al foil with a thickness of 20 μm as the positive electrode current collector foil 11A. After drying, it was subjected to compression molding by roll pressing. Thus, the positive electrode 11 in which the positive electrode active material layer 11B is formed on the positive electrode current collector foil 11A was produced.

<Negative Electrode>

Hard carbon (HC) having a particle size (D50) of 5 μm as a negative electrode active material and PVDF as a binder were mixed at a ratio of 95:5. To this mixture was added NMP as a solvent. Thus, a negative electrode mixture was prepared. This negative electrode mixture was applied to each of both sides of a 15-μm Cu foil as the negative electrode current collector foil 13A. After drying, it was subjected to compression molding by roll pressing. Thus, the negative electrode 13 in which the negative electrode active material layer 13B is formed on the negative electrode current collector foil 13A was produced.

<Separator>

The separator substrate 12A of Example 1 was produced as follows. Specifically, 35 parts by weight of high density polyethylene with a weight-average molecular weight of 600,000 as a raw material, 10 parts by weight of low density polyethylene with a weight-average molecular weight of 200,000, and a plasticizer (fluidized paraffin) were mixed. This mixture was melted and kneaded in an extruder to the tip of which a T-die is attached. Then, the kneaded mixture was extruded, thereby producing a sheet with a thickness of 100 μm. This sheet was immersed in a diethyl ether solvent, thereby extracting and removing the fluidized paraffin, which was further dried. Thus, a porous film before drawing was obtained. This porous film was drawn in biaxial directions within a bath heated to 115° C. to 125° C., which was thereafter subjected to heat treatment. Thus, polyethylene microporous film as the separator substrate 12A was obtained.

The inorganic layer 12B was produced as follows. A surfactant was mixed with alumina particles as inorganic particles, SBR (styrene-butadiene rubber) as a binder, CMC (carboxy methyl cellulose) as a thickener, and ion-exchanged water as a solvent. Thus, a coating agent was prepared. The content ratio of the alumina particles and the binder in the coating agent was set to 97:3. Next, this coating agent was applied onto the separator substrate 12A by gravure coating, followed by drying at 80° C. for 12 hours. Thus, the inorganic layer 12B was formed on the separator substrate 12A.

In this way, the separator 12 of Example 1 was produced. The separator of Example 1 had a stress of 6 MPa at a specific compressed depth that corresponds to 5% of the thickness of the negative electrode active material layer.

<Electrode Assembly>

Next, the positive electrode 11 and the negative electrode 13 were wound with the separator 12 interposed therebetween. At this time, the inorganic layer 12B of the separator 12 was opposed to the positive electrode 11. Thus, the electrode assembly 10 was produced.

<Assembling>

Next, current collectors were attached respectively to the positive electrode and the negative electrode of the electrode assembly 10. Thereafter; the electrode assembly 10 was arranged inside the body 2a of the container 2. Subsequently, the current collectors were welded respectively to the external terminals 21 of the cover 2b, and the cover 2b was attached to the body 2a.

Next, electrolyte was poured. The electrolyte was prepared by dissolving $LiPF_6$ in a mixed solvent of propylene carbonate (PC):dimethyl carbonate (DMC):ethyl methyl carbonate (EMC)=3:2:5 (volume ratio) at 1 mol/L. By the above steps, a lithium ion secondary battery cell of Example 1 was produced.

Examples 2 to 5

The lithium ion secondary battery cells of Examples 2 to 5 were produced basically in the same manner as in Example 1, except that their separators each had a different void ratio in production of the separators. As a result, the separators of Examples 2 to 5 each had a different stress at a specific compressed depth that corresponds to 5% of the thickness of the negative electrode active material layer.

Examples 6 to 10

The lithium ion secondary battery cells of Examples 6 to 10 were produced basically in the same manner as in Examples 1 to 5, except that the weight of the mixture to be applied onto one side was changed (the weight was reduced to 50% of the weight in Example 1) in production of the negative electrode active material layers. As a result, the negative electrode active material layers of Examples 6 to 10 each had a thickness of 20 μm.

Examples 11 to 15

The lithium ion secondary battery cells of Examples 11 to 15 were produced basically in the same manner as in Examples 1 to 5, except that the weight of the mixture to be applied onto one side was changed (the weight was increased to 200% of the weight in Example 1) in production of the negative electrode active material layers. As a result, the negative electrode active material layers of Examples 11 to 15 each had a thickness of 80 μm.

Examples 16 to 20

The lithium ion secondary battery cells of Examples 16 to 20 were produced basically in the same manner as in Example 1, except that the mixing ratio of the plasticizer and the draw ratio were adjusted in production of the separators. As a result, the separators of Examples 16 to 20 each had a different thickness.

Examples 21 to 25

The lithium ion secondary battery cells of Examples 21 to 25 were produced basically in the same manner as in Example 1, except that the mixing ratio of the plasticizer and the draw ratio of the separator substrates were adjusted, the thickness of the separator substrates was adjusted, and the coating thickness was adjusted by changing the weight of the inorganic layers to be applied, in production of the separators. As a result, Examples 21 to 25 each had a different ratio of: Thickness of inorganic layer of separator/Thickness of separator substrate.

Examples 26 to 29

The lithium ion secondary battery cells of Examples 26 to 30 were produced basically in the same manner as in Example 1, except that the fiber diameter of the porous films was adjusted in production of the separators. As a result, the separators of Examples 26 to 30 each had a different restoration rate.

Examples 30 to 34

The lithium ion secondary battery cells of Examples 30 to 34 were produced basically in the same manner as in Examples 1 to 5, except that graphite (Gra) was used as their negative electrode active materials.

Examples 35 to 38

The lithium ion secondary battery cells of Examples 35 to 38 were produced basically in the same manner as in Example 1, except that the negative electrode active materials each had a different D 50 particle size, as shown in Table 1.

Examples 39 and 40

The lithium ion secondary battery cells of Examples 39 and 40 were produced basically in the same manner as in Example 1, except that the design thickness of the electrode assemblies and the internal dimension in the thickness direction of the containers were changed for adjustment. As a result, the electrode assemblies of Examples 39 and 40 each had a different void ratio.

Comparative Examples 1 to 8

The lithium ion secondary battery cells of Comparative Examples 1 to 8 were produced basically in the same manner as in Example 1, except that the thickness, type, etc., of the negative electrode active material layers were changed for adjustment. As a result, the separators of Comparative Examples 1 to 8 each had a stress of 15 to 18 MPa at a specific compressed depth that corresponds to 5% of the thickness of the negative electrode active material layer.

(Evaluation Methods)

The lithium ion secondary battery cells of Examples 1 to 40 and Comparative Examples 1 to 8 were evaluated for temporary deterioration rate and incidence of micro-short circuits. The lithium ion secondary battery cells of Examples 1 and 35 to 38 were further evaluated for initial coulomb efficiency. The lithium ion secondary battery cells of Examples 21 to 25 were further evaluated for temperature increase in a nail penetration test. For such evaluation, three battery cells were used, and their values were averaged. The methods for determining temporary deterioration, incidence of micro-short circuits, initial coulomb efficiency, and temperature increase in a nail penetration test are as described below.

(Temporary Deterioration)

Evaluation for temporary deterioration rate was conducted with a resistance at 50% SOC. The SOC was adjusted to 50% by performing discharge at 1 C (A) to a minimum voltage of 2.4 V, followed by charge at 0.5 C (A) for 1 hour. The current 1 C (A) herein means a current value that allows Q 1(Ah) to be conducted by applying such a current for 1 hour, where Q 1(Ah) is the capacity of the current discharged in the immediately previous discharge test (maximum: 4.1 V; minimum: 2.4 V) at 25° C. and 4 A.

First, after the SOC was adjusted to 50%, a resistance value D1 was measured. Specifically, when the capacity of the current discharged in the immediately previous discharge test (maximum: 4.1 V; minimum: 2.4 V) at 25° C. and 4 A was taken as 1 C, a current adjusted to achieve the 50% SOC at 25° C. and 0.5 C for 1 hour was applied in the 20-C discharge direction from a discharged state. The resistance value D1 was calculated by (Difference between voltage at the tenth second and voltage before current application)/Current.

Thereafter, charge in the same amount of electricity as discharged during the determination of D1 performed at a current value of 6 A, and the SOC was adjusted again to 50%. Continuous 1000 cycles each including a 30-second continuous discharge and a 30-second continuous charge within two minutes at a 10-C current and 50% SOC were performed. Then, an output power test was conducted within 2 hours after the cycles ended at 50% SOC, so that a resistance value D2 was calculated. From those resistance values, the deterioration rate: D2/D1 was calculated. Table 1 below shows the respective values of the examples with respect to the value of Example 1 taken as 100%.

(Incidence of Micro-Short Circuits)

After a constant-voltage charge at 3.1 V, which is 20% of the rated capacity of the battery cell, was performed for 3 hours, a voltage was measured after a lapse of 1 to 12 hours. The voltage was measured again after 20 days at 25° C. The difference in voltage was taken as a decrease in battery voltage. 20 cells per standard were tested, and the percentage of the battery cells that underwent a decrease in battery voltage of 0.1 V or more was calculated as the incidence of micro-short circuits. Table 1 below shows the results.

(Initial Coulomb Efficiency)

An initial coulomb efficiency C (%) was determined by the following formula 6 when the initial charge electricity of the non-aqueous electrolyte secondary battery cell 1 was denoted by A (Ah), and the initial discharge capacity thereof was denoted by B (Ah). Table 1 below shows the respective values of the examples with respect to the value of Example 1 taken as 100%. In this example, a method of the initial charge at a voltage throughout the charge of 4.1 V and a voltage throughout the discharge of 2.4 V was employed.

$$C = B/A \times 100 \qquad \text{(formula 6)}$$

(Temperature Increase in Nail Penetration Test)

An initial temperature in a nail penetration test was set to 25° C., and the SOC was adjusted to 80%. Then, a nail made of stainless steel (diameter: 1 mm) was inserted so as to penetrate through the center portion of a surface on the longitudinal side. The SOC was adjusted at 25° C. and 0.5 C for 1.6 hours from a discharged state, when the capacity of the current discharged in the immediately previous discharge test (maximum: 4.1 V; minimum: 2.4 V) at 25° C. and 4 A was taken as 1 C. A surface temperature of the battery cell after insertion of the nail was measured, thereby determining the value of temperature increase in a nail penetration test. The temperature increase rate in each example was determined with respect to the temperature increase rate of Example 1 taken as 100%.

EVALUATION RESULTS

TABLE 1

| | 5% Compressive Stress (MPa) | Thickness of Negative Electrode Mixture Layer (μm) | Thickness of Separator (μm) | Thickness of Inorganic Layer/ Thickness of Substrate | Restoration Rate of Separator (%) | Negative Electrode Active Material | D 50 Particle Size of Negative Electrode Active Material (μm) | Void Ratio of Electrode Assembly (%) | Temporary Deterioration rate (% ratio to EX. 1) | Incidence of Micro-Short Circuits (%) | Initial Coulomb Efficiency (%) |
|---|---|---|---|---|---|---|---|---|---|---|---|
| EX. 1 | 6.0 | 40 | 22 | 0.4 | 3.5 | HC | 5 | 10 | 100 | 0 | 100 |
| EX. 2 | 0.5 | 40 | 22 | 0.4 | 3.5 | HC | 5 | 10 | 97 | 20 | — |
| EX. 3 | 1.0 | 40 | 22 | 0.4 | 3.5 | HC | 5 | 10 | 99 | 0 | — |
| EX. 4 | 9.0 | 40 | 22 | 0.4 | 3.5 | HC | 5 | 10 | 103 | 0 | — |
| EX. 5 | 14.0 | 40 | 22 | 0.4 | 3.5 | HC | 5 | 10 | 110 | 0 | — |
| EX. 6 | 6.0 | 20 | 22 | 0.4 | 3.5 | HC | 5 | 10 | 98 | 0 | — |
| EX. 7 | 0.5 | 20 | 22 | 0.4 | 3.5 | HC | 5 | 10 | 96 | 35 | — |
| EX. 8 | 1.0 | 20 | 22 | 0.4 | 3.5 | HC | 5 | 10 | 98 | 0 | — |
| EX. 9 | 9.0 | 20 | 22 | 0.4 | 3.5 | HC | 5 | 10 | 101 | 0 | — |
| EX. 10 | 14.0 | 20 | 22 | 0.4 | 3.5 | HC | 5 | 10 | 108 | 0 | — |
| EX. 11 | 6.0 | 80 | 22 | 0.4 | 3.5 | HC | 5 | 10 | 103 | 0 | — |
| EX. 12 | 0.5 | 80 | 22 | 0.4 | 3.5 | HC | 5 | 10 | 101 | 15 | — |
| EX. 13 | 1.0 | 80 | 22 | 0.4 | 3.5 | HC | 5 | 10 | 102 | 0 | — |
| EX. 14 | 9.0 | 80 | 22 | 0.4 | 3.5 | HC | 5 | 10 | 103 | 0 | — |
| EX. 15 | 14.0 | 80 | 22 | 0.4 | 3.5 | HC | 5 | 10 | 110 | 0 | — |
| EX. 16 | 6.0 | 40 | 12 | 0.4 | 3.5 | HC | 5 | 10 | 99 | 40 | — |
| EX. 17 | 6.0 | 40 | 15 | 0.4 | 3.5 | HC | 5 | 10 | 99 | 0 | — |
| EX. 18 | 6.0 | 40 | 18 | 0.4 | 3.5 | HC | 5 | 10 | 99 | 0 | — |
| EX. 19 | 6.0 | 40 | 25 | 0.4 | 3.5 | HC | 5 | 10 | 106 | 0 | — |
| EX. 20 | 6.0 | 40 | 30 | 0.4 | 3.5 | HC | 5 | 10 | 115 | 0 | — |
| EX. 21 | 6.0 | 40 | 22 | 0 | 3.5 | HC | 5 | 10 | 105 | 0 | — |
| EX. 22 | 6.0 | 40 | 22 | 0.2 | 3.5 | HC | 5 | 10 | 103 | 0 | — |
| EX. 23 | 6.0 | 40 | 22 | 0.6 | 3.5 | HC | 5 | 10 | 104 | 0 | — |
| EX. 24 | 6.0 | 40 | 22 | 1 | 3.5 | HC | 5 | 10 | 106 | 0 | — |
| EX. 25 | 6.0 | 40 | 22 | 1.4 | 3.5 | HC | 5 | 10 | 112 | 0 | — |
| EX. 26 | 6.0 | 40 | 22 | 0.4 | 1.8 | HC | 5 | 10 | 111 | 0 | — |
| EX. 27 | 6.0 | 40 | 22 | 0.4 | 2.3 | HC | 5 | 10 | 109 | 0 | — |
| EX. 28 | 6.0 | 40 | 22 | 0.4 | 2.8 | HC | 5 | 10 | 103 | 0 | — |
| EX. 29 | 6.0 | 40 | 22 | 0.4 | 4.6 | HC | 5 | 10 | 100 | 0 | — |
| EX. 30 | 6.0 | 40 | 22 | 0.4 | 3.5 | Gra | 5 | 10 | 104 | 0 | — |
| EX. 31 | 0.5 | 40 | 22 | 0.4 | 3.5 | Gra | 5 | 10 | 102 | 0 | — |
| EX. 32 | 1.0 | 40 | 22 | 0.4 | 3.5 | Gra | 5 | 10 | 101 | 0 | — |
| EX. 33 | 9.0 | 40 | 22 | 0.4 | 3.5 | Gra | 5 | 10 | 109 | 0 | — |
| EX. 34 | 11.0 | 40 | 22 | 0.4 | 3.5 | Gra | 5 | 10 | 113 | 0 | — |
| EX. 35 | 6.0 | 40 | 22 | 0.4 | 3.5 | HC | 2 | 10 | 99 | 0 | 98 |
| EX. 36 | 6.0 | 40 | 22 | 0.4 | 3.5 | HC | 3 | 10 | 100 | 0 | 100 |
| EX. 37 | 6.0 | 40 | 22 | 0.4 | 3.5 | HC | 6 | 10 | 101 | 0 | 100 |
| EX. 38 | 6.0 | 40 | 22 | 0.4 | 3.5 | HC | 8 | 10 | 106 | 0 | 100 |
| EX. 39 | 6.0 | 40 | 22 | 0.4 | 3.5 | HC | 5 | 0 | 97 | 0 | — |
| EX. 40 | 6.0 | 40 | 22 | 0.4 | 3.5 | HC | 5 | 1 | 100 | 0 | — |
| C. EX. 1 | 18.0 | 40 | 22 | 0.4 | 3.5 | HC | 5 | 10 | 145 | 0 | — |
| C. EX. 2 | 18.0 | 20 | 22 | 0.4 | 3.5 | HC | 5 | 10 | 138 | 0 | — |
| C. EX. 3 | 18.0 | 80 | 22 | 0.4 | 3.5 | HC | 5 | 10 | 161 | 0 | — |
| C. EX. 4 | 18.0 | 40 | 22 | 0.4 | 3.5 | Gra | 5 | 10 | 168 | 0 | — |
| C. EX. 5 | 15.0 | 40 | 22 | 0.4 | 3.5 | Gra | 5 | 10 | 140 | 0 | — |
| C. EX. 6 | 16.0 | 20 | 22 | 0.4 | 3.5 | HC | 5 | 10 | 120 | 0 | — |
| C. EX. 7 | 16.0 | 40 | 22 | 0.4 | 3.5 | HC | 5 | 10 | 125 | 0 | — |
| C. EX. 8 | 16.0 | 80 | 22 | 0.4 | 3.5 | HC | 5 | 10 | 130 | 0 | — |

As shown in Table 1, Comparative Examples 1 to 3 and 6 to 8 in which the separator had a stress exceeding 14 MPa at a specific compressed depth that corresponds to 5% of the thickness of the negative electrode active material layer showed high temporary deterioration rate as compared to Examples 1 to 29 and 35 to 40 that used the same negative electrode active material (hard carbon). Similarly, Comparative Examples 4 and 5 in which the separator had a stress exceeding 14 MPa at a specific compressed depth that corresponds to 5% of the thickness of the negative electrode active material layer showed high temporary deterioration rate as compared to Examples 30 to 34 that used the same negative electrode active material (graphite).

In this way, Examples 1 to 29 and 35 to 40 in which the negative electrode active material contained hard carbon and the separator had a stress of 0.5 MPa or more and 14 MPa or less at a specific compressed depth that corresponds to 5% of the thickness of the negative electrode active material layer had a temporary deterioration rate of 115% or less, which was a lower value than that of Comparative Examples 1 to 3 and 6 to 8 that used the same negative electrode active material. Similarly, Examples 30 to 34 in which the negative electrode active material contained graphite and the separator had a stress of 0.5 MPa or more and 14 MPa or less at a specific compressed depth that corresponds to 5% of the thickness of the negative electrode active material layer had a temporary deterioration rate of 125% or less, which was a lower value than that of Comparative Examples 4 and 5 that used the same negative electrode active material.

It was confirmed from above that the present examples were capable of reducing temporary deterioration of lithium ion secondary battery cells by the separator having a stress of 0.5 MPa or more and 14 MPa or less at a specific compressed depth that corresponds to 5% of the thickness of the negative electrode active material layer.

Further, among Examples 1 to 5 that were produced so that only the stress of the separator at the specific compressed depth (hereinafter, which may be also simply referred to as a 5% compressive stress) was different, Examples 1 and 3 to 5 having a 5% compressive stress of 0.5 MPa or more and 14 MPa or less could reduce the incidence of micro-short circuits as compared to Example 2 having a 5% compressive stress of less than 0.5 MPa. Such an effect also applies to the incidence of micro-short circuits of Example 7 among Examples 6 to 10, and Example 12 among Examples 11 to 15, which were produced so that only the 5% compressive stress was different. Accordingly, the present examples can suppress micro-short circuits, while reducing temporary deterioration of lithium ion secondary battery cells, by the separator having a stress of 0.5 MPa or more and 14 MPa or less at a specific compressed depth that corresponds to 5% of the thickness of the negative electrode active material layer.

Further, among Examples 1 and 16 to 20 that were produced so that only the thickness of the separator was different, Examples 1 and 17 to 19 in which the thickness of the separator was 15 μm or more and 25 μm or less had lower incidence of micro-short circuits than Example 16 in which the thickness of the separator was less than 15 μm, and could further reduce temporary deterioration than Example 20 in which the thickness of the separator exceeded 25 μm.

Further, among Examples 1 and 21 to 25 that were produced so that only the ratio of: Thickness of inorganic layer of separator/Thickness of separator substrate was different, Examples 1 and 22 and 23 in which the ratio of: Thickness of inorganic layer of separator/Thickness of separator substrate was 0.2 or more and less than 1 could further reduce temporary deterioration, as compared to Example 21 in which the ratio of: Thickness of inorganic layer of separator/Thickness of separator substrate was less than 0.2 and Examples 24 and 25 in which the ratio of: Thickness of inorganic layer of separator/Thickness of separator substrate was 1 or more.

Further, among Examples 1 and 26 to 29 that were produced so that only the restoration rate of the separator was different, Examples 1, 28 and 29 in which the restoration rate was 2.8% or more could further reduce temporary deterioration, as compared to Examples 26 and 27 in which the restoration rate was less than 2.8%.

Further, among Examples 1 to 5 and 30 to 34 that were produced so that only the negative electrode active material was different, Examples 1 to 5 in which the negative electrode active material was hard carbon showed low temporary deterioration, as compared to Examples 30 to 34 in which the negative electrode active material was graphite. It has been seen from this that the negative electrode active material containing hard carbon could further reduce temporary deterioration.

Further, among Examples 1 and 35 to 38 that were produced so that only the D 50 particle size of the negative electrode active material was different, Examples 1, 36, and 37 in which the D 50 particle size was 3 μm or more and 6 μm or less showed higher initial coulomb efficiency than Example 35 in which the D 50 particle size was less than 3 μm, and could further reduce temporary deterioration as compared to Example 38 in which the D 50 particle size exceeded 6 μm.

The temperature increase of Examples 21 to 25 in a nail penetration test was checked, as a result which Example 21 showed 150%, Example 22 showed 120%, Example 23 showed 95%, Example 24 showed 90%, and Example 25 showed 86%. These results demonstrated that, the higher the value of the ratio of: Thickness of inorganic layer of separator/Thickness of separator substrate was, the more the temperature increase was suppressed.

The embodiments and examples of the present invention have been described above. However, the present invention is not limited to these embodiments and examples. It is intended from the beginning to change the design as appropriate by combining the features of the aforementioned embodiments and examples as appropriate. The operational advantage of the present invention is also not limited to the foregoing embodiments.

The embodiments disclosed herein should be construed in all respects as illustrative but not limiting. The scope of the present invention is not indicated by the foregoing description but by the scope of the claims. Further, The scope of the present invention is intended to include all the modifications equivalent in the sense and the scope to the scope of the claims.

What is claimed is:

1. A lithium ion secondary battery cell comprising:
a container:
an electrode assembly contained in the container, the electrode assembly comprising:
a positive electrode comprising a positive electrode substrate and a positive electrode active material layer formed on the positive electrode substrate, the positive electrode active material layer containing a positive electrode active material comprising a lithium composite oxide,
a negative electrode comprising a negative electrode substrate and a negative electrode active material layer formed on the negative electrode substrate, the negative electrode active material containing a negative electrode active material, and a separator interposed between the positive electrode and the negative electrode; and an electrolyte contained in the container, the electrolyte comprising a lithium salt, wherein the separator is configured such that a stress that is caused at a specific compressed depth in the separator, which corresponds to 5% of the thickness of the negative electrode active material, is 0.5 MPa or more and 14 MPa or less;

the negative electrode active material contains hard carbon; and a ratio of a volume of the electrolyte with respect to a void volume of the lithium ion secondary battery cell is 120% or more and 180% or less.

2. The lithium ion secondary battery cell according to claim 1, wherein the stress caused at the specific compressed depth in the separator is 1 MPa or more and 10 MPa or less.

3. The lithium ion secondary battery cell according to claim 1, wherein the stress caused at the specific compressed depth in the separator is 3 MPa or more and 5 MPa or less.

4. The lithium ion secondary battery cell according to claim 1, wherein the separator has a thickness of 15 µm or more and 25 µm or less.

5. The lithium ion secondary battery cell according to claim 1, wherein the separator has a thickness of 18 µm or more and 22 µm or less.

6. The lithium ion secondary battery cell according to claim 1, wherein the separator comprises a separator substrate and an inorganic layer formed on the separator substrate, and a ratio of the thickness of the inorganic layer to the thickness of the separator substrate is 0.2 or more and less than 1.

7. The lithium ion secondary battery cell according to claim 6, wherein the inorganic layer has a peeling strength of 5 gf or more and 80 gf or less.

8. The lithium ion secondary battery cell according to claim 1, wherein the separator has a restoration rate by a loading/unloading test of 2.8% or more.

9. The lithium ion secondary battery cell according to claim 1, wherein the separator has an air resistance of 30 sec/100 cc or more and 150 sec/100 cc or less.

10. An electric storage apparatus comprising a plurality of lithium ion secondary battery cells according to claim 1.

11. An electric storage apparatus comprising a plurality of lithium ion secondary battery cells according to claim 2.

12. An electric storage apparatus comprising a plurality of lithium ion secondary battery cells according to claim 4.

13. An electric storage apparatus comprising a plurality of lithium ion secondary battery cells according to claim 6.

14. The lithium ion secondary battery cell according to claim 1, wherein the negative electrode active material has a particle size of 3 µm or more and 6 µm or less.

15. The lithium ion secondary battery cell according to claim 1, wherein the negative electrode active material has a particle size of 3 µm or more and 5 µm or less.

* * * * *